US012314710B2

(12) United States Patent
Silverstein et al.

(10) Patent No.: US 12,314,710 B2
(45) Date of Patent: May 27, 2025

(54) SAVE CONTEXT CAPTURING

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Jill S. Dhillon, Laguna Niguel, CA (US); Jennifer M. Hatfield, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 18/169,494

(22) Filed: Feb. 15, 2023

(65) Prior Publication Data
US 2024/0272899 A1 Aug. 15, 2024

(51) Int. Cl.
*H04N 21/43* (2011.01)
*G06F 8/71* (2018.01)
*H04N 21/478* (2011.01)

(52) U.S. Cl.
CPC ...................... *G06F 8/71* (2013.01)

(58) Field of Classification Search
CPC .......................................................... G06F 8/71
See application file for complete search history.

(56) References Cited

U.S. PATENT DOCUMENTS

| | | | |
|---|---|---|---|
| 5,946,699 A * | 8/1999 | Sawashima | G06F 16/219 707/999.203 |
| 7,042,594 B1 | 5/2006 | Dawe | |
| 7,392,466 B2 | 6/2008 | Pan | |
| 7,552,421 B1 | 6/2009 | Raw | |
| 8,577,846 B1 | 11/2013 | Axe | |
| 9,110,770 B1 * | 8/2015 | Raju | G06F 8/10 |
| 9,135,171 B2 | 9/2015 | Baskakov | |
| 10,275,282 B1 * | 4/2019 | Brandwine | H04L 67/306 |
| 10,592,236 B2 | 3/2020 | Krauss | |
| 11,237,824 B2 | 2/2022 | Masis | |
| 11,327,747 B2 | 5/2022 | Kwatra | |
| 11,785,280 B1 * | 10/2023 | Dakss | H04N 21/478 725/37 |
| 11,922,222 B1 * | 3/2024 | Chawla | G06F 9/5077 |
| 2019/0171437 A1 | 6/2019 | Guda | |
| 2022/0179637 A1 * | 6/2022 | Chettymani | G06F 8/65 |
| 2023/0256988 A1 * | 8/2023 | Gangundi | G06F 8/65 701/23 |

FOREIGN PATENT DOCUMENTS

| | | |
|---|---|---|
| CN | 106164908 B | 12/2019 |
| CN | 114741088 A | 7/2022 |
| CN | 115114900 A | 9/2022 |

* cited by examiner

*Primary Examiner* — S. Sough
*Assistant Examiner* — Mohammad H Kabir
(74) *Attorney, Agent, or Firm* — James L. Olsen

(57) ABSTRACT

Aspects of the present disclosure relate to save context capturing. An indication of a save of a version of software can be received. Contextual data associated with a user managing the version of the software can be associated with the save of the version of software, the contextual data captured during a timeframe temporally related to the save. The association between the contextual data and the save of the version of the software can be stored in a software versioning repository. The save of the version of the software and the associated contextual data can be retrieved in response to a predetermined condition or a request.

18 Claims, 4 Drawing Sheets

SAVE CONTEXT CAPTURING

BACKGROUND

The present disclosure relates generally to the field of computing, and in particular, to save context capturing.

Software versions refer to unique states of computer software, which may be assigned version names or numbers. Versioning control is used to track incremental versions of information associated with computer software. This can be completed on operating system (OS) level software, application level software (e.g., application patches), and subcomponents thereof (e.g., files), among other types of software.

Many software platforms incorporate autosave functionality. Current software allows iterative saves (e.g., automatic or manual), which provides the capability of capturing various versions of software as updates (e.g., to code or files) are made. As such, there may be many different versions of software saved within a software versioning repository associated with a given software. This can make it difficult for users to traverse and analyze old versions of software, as there may be a large number of versions with little to no information regarding notable updates made to each version. Improvements are needed for improving organization and navigation of stored software versions.

SUMMARY

Aspects of the present disclosure relate to a computer program product, system, and method for save context capturing. An indication of a save of a version of software can be received. Contextual data associated with a user managing the version of the software can be associated with the save of the version of software, the contextual data captured during a timeframe temporally related to the save. The association between the contextual data and the save of the version of the software can be stored in a software versioning repository. The save of the version of the software and the associated contextual data can be retrieved in response to a predetermined condition or a request.

The above computer program product, system, and method for provide various improvements. By storing associations between collected contextual data of users updating software with the saves of the versions of software during timeframes temporally related to the saves, contextual conditions related to the save can be captured for later reference. This can improve the software development pipeline, as users may be aware of contextual conditions that occurred during previous saves of versions of software. The contextual data can provide insights for improving development of future software. Further still, aspects of the present disclosure improve the organization of versions of software. Rather than merely including previous versions of software and associated change logs within a software versioning repository, the stored software version data can be enriched with contextual data that can allow users to readily understand various contextual aspects of the previously saved versions of software. For example, a user can recall more information about a particular version of software based on viewing their contextual data associated with the particular version of software.

In embodiments, the contextual data includes sentiment data collected from the user, where the sentiment data is analyzed to generate a sentiment score associated with the save of the version of software, where the sentiment score is stored in the software versioning repository with the association and is retrieved with the save of the version of software in response to the predetermined condition or the request. This can enable the user managing the version of software to ascertain their sentiment during the timeframe temporally related to the save, which can enhance the user's understanding of the version of the software.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
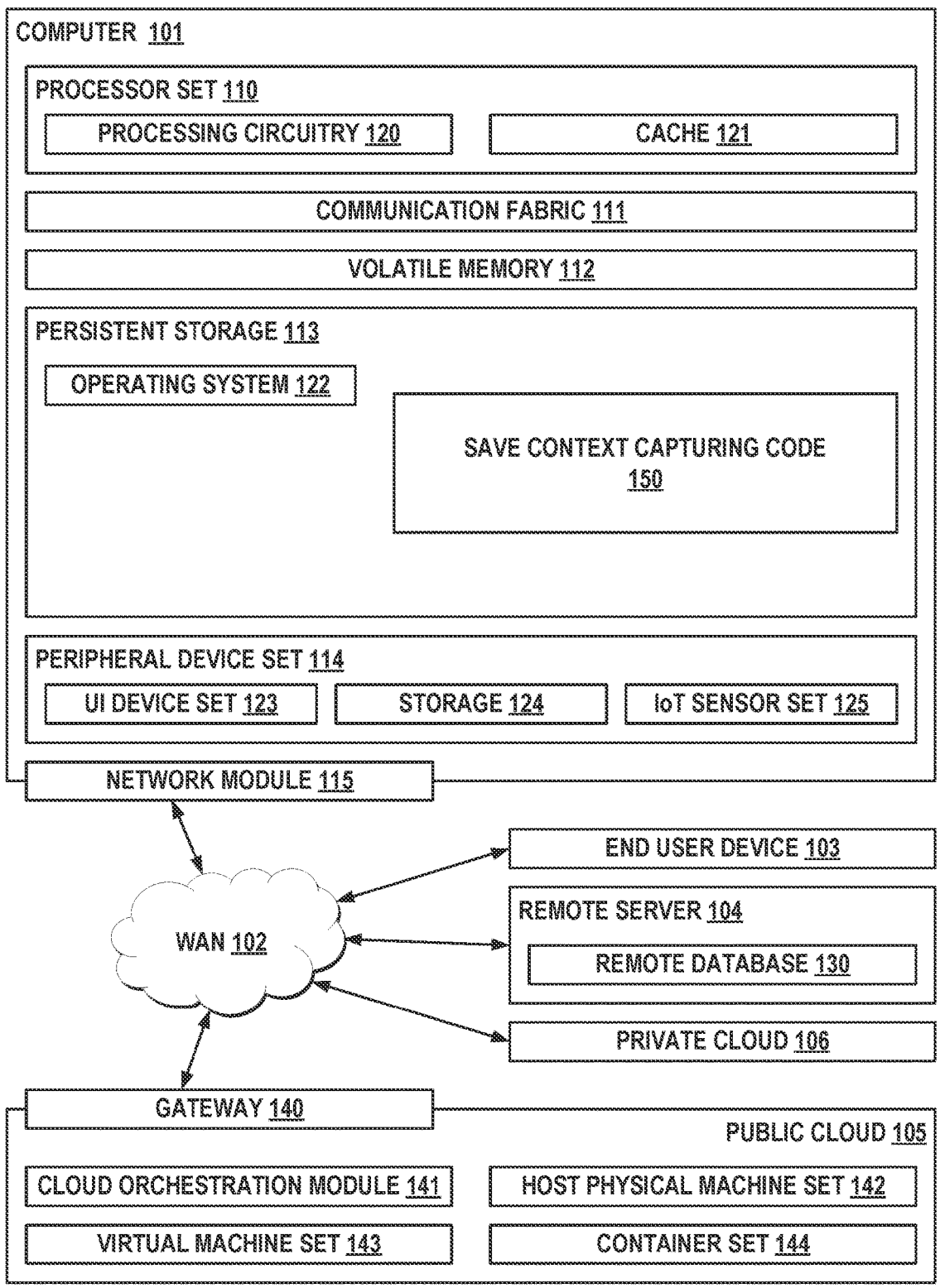
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to save context capturing. While the present disclosure is not necessarily limited to such applications, various aspects of the disclosure may be appreciated through a discussion of various examples using this context.

As referenced herein, "software" refers to system software and/or application software that can be used to manage hardware behavior, basic computer operations, or special computer functions. Software can refer to OS software, device drivers, application software, or portions thereof, including files, scripts, plugins, and microcode. Software generally refers to computer programs and associated data, as opposed to hardware which performs computing work. Software development may occur in an integrated development environment (IDE) or another platform. Software can be developed/expressed in various languages and may include high-level programming languages which can then be translated into machine language using a compiler/interpreter. A change or update to software can relate to any alteration/update to software components (e.g., files, directories, scripts, code, etc.). As referenced herein, a "save" refers to storing a current state of a software in a memory/storage medium.

Software versions refer to unique states of computer software, which may be assigned version names or numbers. Versioning control is used to track incremental versions of information associated with computer software. This can be completed on operating system (OS) level software, application level software (e.g., application patches), and subcomponents thereof (e.g., files), among other types of software.

Many software platforms incorporate autosave functionality. Current software allows iterative saves (e.g., automatic or manual), which provides the capability of capturing various versions of software as updates (e.g., to code or files) are made. As such, there may be many different versions of software saved within a software versioning repository associated with a given software. This can make it difficult for users to traverse and analyze old versions of software, as there may be a large number of versions with little to no information regarding notable updates made to each version. Improvements are needed for improving organization and navigation of stored software versions.

Aspects of the present disclosure relate to save context capturing. An indication of a save of a version of software can be received. Contextual data (e.g., sensor data, such as sentiment data, biometric data, location data, speech data, visual data, etc.) associated with a user managing the version of the software (e.g., updating or editing the version of software) can be associated with the save of the version of software, the contextual data captured during a timeframe temporally related to the save (e.g., a predetermined time period before and/or after the save occurs). The association between the contextual data and the save of the version of the software can be stored in a software versioning repository. The save of the version of the software and the associated contextual data can be retrieved in response to a predetermined condition or a request.

Aspects of the present disclosure provide various improvements. By storing associations between collected contextual data of users updating software with the saves of the versions of software during timeframes temporally related to the saves, contextual conditions related to the save can be captured for later reference. This can improve the software development pipeline, as users may be aware of contextual conditions that occurred during previous saves of versions of software. The contextual data can provide insights for improving development of future software. For example, a positive sentiment associated with a previously saved version of software can be readily ascertained by the user by referencing the association which can aid in future development of the software (e.g., the user can integrate aspects of the previous version related to the positive sentiment in a new version of software). Further still, aspects of the present disclosure improve the organization of versions of software. Rather than merely including previous versions of software and associated change logs within a software versioning repository, the stored software version data can be enriched with contextual data that can allow users to readily understand various contextual aspects of the previously saved versions of software. For example, a user can recall more information about a particular version of software based on viewing their contextual data associated with the particular version of software, such as their speech, classified emotions/tones, biometrics, locations, and the like.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as save context capturing code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and save context capturing code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in save context capturing code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in save context capturing code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
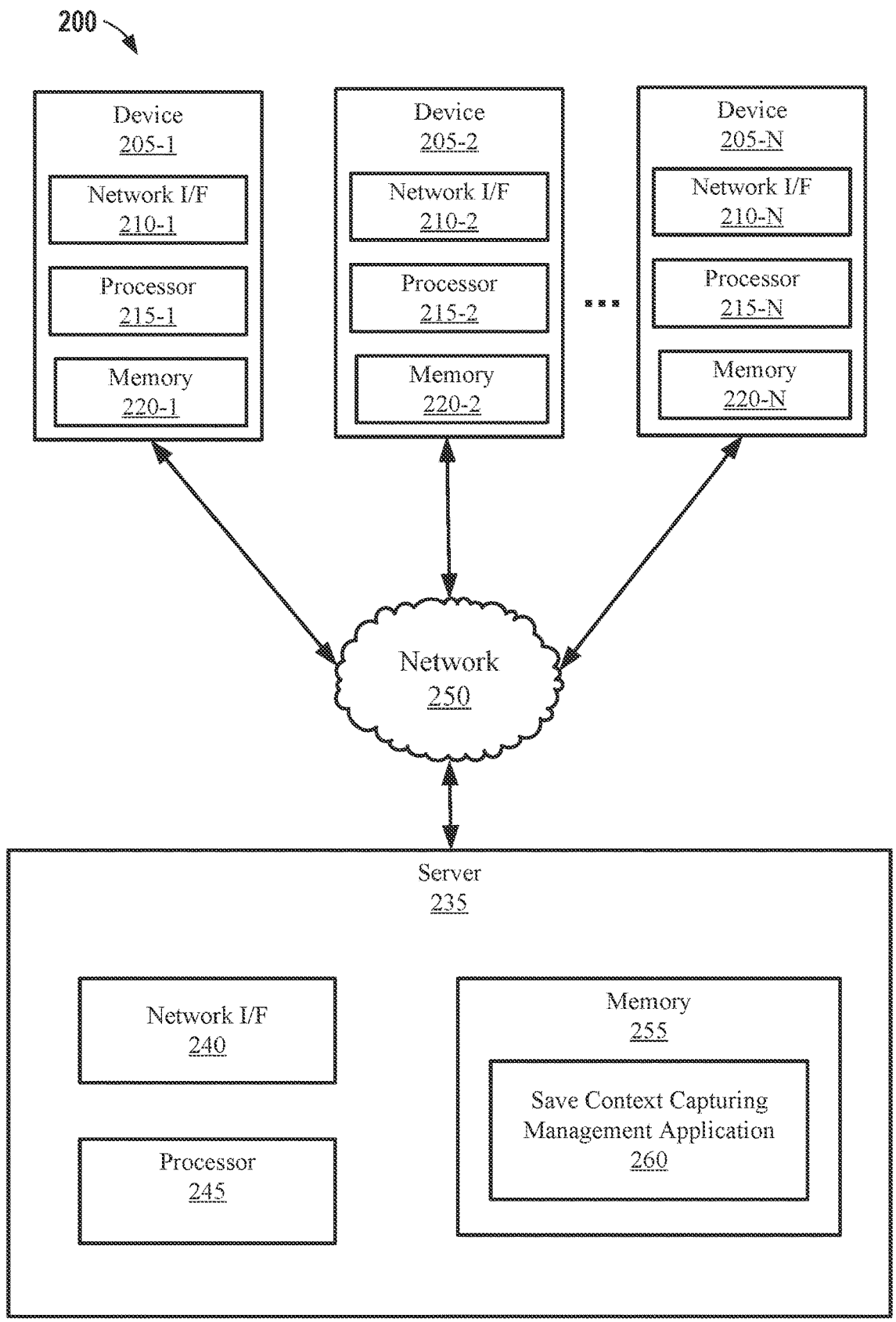
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2 . . . 205-N (collectively devices 205), at least one server 235, and a network 250.

The devices 205 and the server 235 include one or more processors 215-1, 215-2, . . . 215-N (collectively processors 215) and 245, respectively, and one or more memories 220-1, 220-2, . . . , 220-N (collectively memories 220) and 255, respectively. The processors 215 and 245 can be same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2 . . . 210-N (collectively network interfaces 210) and 240, respectively. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can include components/devices such as those described with respect to peripheral device set 114 of FIG. 1. The devices 205 and/or the server 235 can be servers, desktops, laptops, or handheld devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a save context capturing management application (SCCMA) 260. The SCCMA 260 (e.g., save context capturing code 150) can be configured to associate contextual data (e.g., sensor data such as biometrics, visual data, audio data, location data, environmental data, sentiment data, etc.) with saves of versions of software. The associations between contextual data and saves of versions of software can be stored in a software versioning repository such that users can view contextual data associated with specific versions of software. This can aid the users in understanding contextual circumstances regarding versions of software at times when saves were generated (e.g., timeframes temporally related to the saves of the version of software).

The SCCMA 260 can be configured to receive contextual data within an environment of a user performing updates on a software (e.g., managing the version of the software). The contextual data can be collected from any suitable sensor in the environment of the user performing updates on the software. For example, the contextual data can be collected from microphones, wearable devices, mobile devices, cameras, biometric sensors, location sensors, and input devices (e.g., a mouse or keyboard), among other types of devices/sensors. The contextual data can be collected over any suitable time interval, such as intermittently, periodically, continuously, and/or responsive to a save or a condition in which a future save will occur (e.g., a periodic autosave timing). Any suitable contextual data can be captured from the user updating the version of the software. For example, contextual data can include speech data (e.g., utterances from the user), visual data (e.g., images of the user and/or their environment), sentiment data (e.g., interpreted audio or visual data which can indicate sentiment of the user), biometrics (e.g., heart rate, glucose levels, facial recognition data, voice recognition data, etc.), location data, and device input data (e.g., mouse and/or keyboard actions), among other types of contextual data. In embodiments, the contextual data can be analyzed to glean insights from the contextual data (e.g., location analysis, sentiment analysis, etc.) such that the insights can be stored with the association between the contextual data and the save of the version of software.

Upon receiving an indication of the save, the SCCMA 260 can be configured to associate contextual data captured during a timeframe temporally related the save (e.g., a predetermined time window before and/or after the save) with the version of software for which the save was executed on. The association can be stored in a software versioning repository, which can be a datastore configured to store iterative versions of software as updates/saves occur over time. Then, at a future time, when a predetermined condition is met or a request is made, the version of the software and associated contextual data can be retrieved from the software versioning repository for presentation to a user. This can allow the user to understand the contextual conditions in which previous saves of versions of software were made, which may aid in future development of the software. For example, if save is associated with a positive context (e.g., a positive sentiment of the user managing the version of the software), some of the updates made to that version of software can be mirrored in a current version of the software to improve the development of the software.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., contextual data associated with users updating software), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
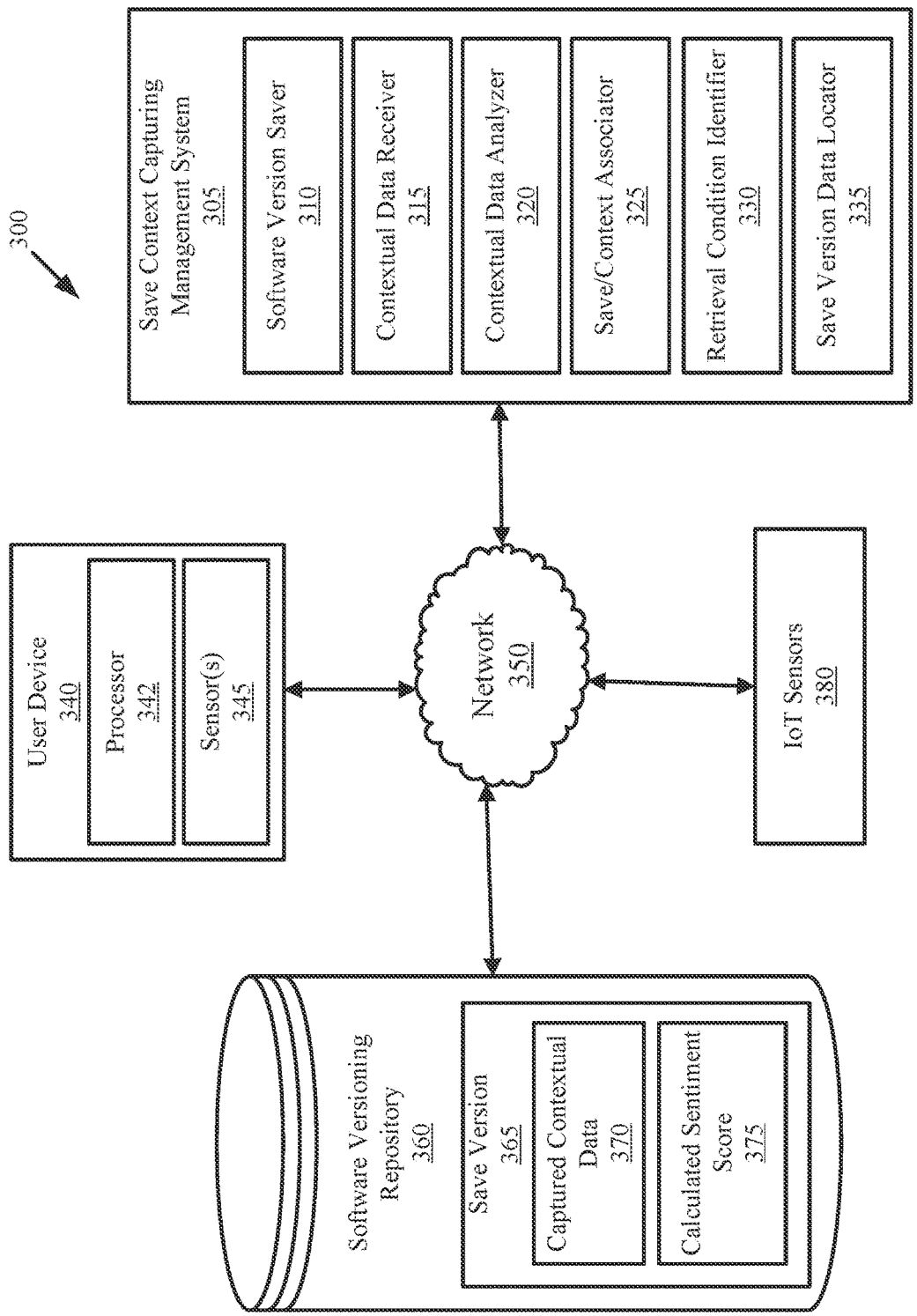
FIG. 3 is a block diagram illustrating an example network environment including a save context capturing management system, in accordance with embodiments of the present disclosure.

Referring now to FIG. 3, shown is a block diagram illustrating an example network environment 300 in which illustrative embodiments of the present disclosure can be implemented. The network environment 300 includes a save context capturing management system management system (SCCMS) 305, a user device 340, a software versioning repository 360, and IoT sensors 380, each of which can be communicatively coupled for intercomponent interaction via a network 350. In embodiments, the network 350 can be the same as, or substantially similar to, network 250 and/or WAN 102. In embodiments, the user device 340, IoT sensors 380, and SCCMS 305 can be the same as, or substantially similar to, computer 101, devices 205, and/or server 235.

The SCCMS 305 can be configured to associate contextual data with saves of versions of software. The contextual data may be collected in an environment of a user of the user device 340 who is actively performing updates on the software (e.g., managing the software). The associations between contextual data and saves of versions of software can be stored in the software versioning repository 360 such that users can view contextual data associated with specific versions of software. This can aid the users in understanding contextual circumstances regarding versions of software at times when saves were generated.

The user device 340 includes a processor 342 and sensors 345. In embodiments, the user device 340 can be a personal device (e.g., a smart phone, laptop, or desktop computer) of a user which enables the user to interface (e.g., control, manage, view, etc.) the SCCMS 305. For example, an application (e.g., SCCMA 260) which allows the user to change configuration settings of functionalities of the SCCMS 305 can be installed on the user device 340. This can allow the user to set configuration settings for types of contextual data that are permitted to be collected, types of analysis that are permitted to be completed on the contextual data, timeframes in which contextual data is considered to be associated with a save, and types of devices/sensors permitted to collect contextual data, among other configuration settings. In embodiments, the user device 340 allows a user to update software. For example, the user device 340 can allow the user to locally update/edit software and/or to connect to a platform facilitating software development over network 350 (e.g., such as an IDE). Though a single user device 340 is shown in FIG. 3, any number of user devices can be implemented without departing from the spirit and scope of the present disclosure.

The SCCMS 305 includes a software version saver 310, a contextual data receiver 315, a contextual data analyzer 320, a save/context associator 325, a retrieval condition identifier 330, and a save version data locator 335. The functionalities of the software version saver 310, contextual data receiver 315, contextual data analyzer 320, save/context associator 325, retrieval condition identifier 330, and save version data locator 335 can be processor-executable instructions that can be executed by a dedicated or shared processor using received inputs.

The software version saver 310 can be configured to perform saves on software and/or receive indications of saves performed on software. A save refers to an updated software version that is stored in a memory/storage medium. A save does not necessarily have to be designated with a new version name and/or number to be considered a save. That is, a minor update to software (e.g., a single character/number change within code, a script, a file, etc.) can also be considered a save. Saves performed by the software version saver 310, or indications of saves received by the software version saver 310, can be manual or automatic. That is, the saves can be performed in response to a user command (e.g., a user executes a manual save) or automatically based on configured autosave settings (e.g., dictating the frequency and/or conditions in which saves occur, such as periodically or in response to a threshold number of updates).

In embodiments, the software version saver 310 can be configured to interface with a software development platform (e.g., an IDE) or other software program (e.g., a document editor) to receive indications of saves. In embodiments, the software version saver 310 can be configured to receive autosave settings from the software development platform or another software program. For example, the software version saver 310 can be configured to receive autosave settings such that the frequency in which saves occur and conditions in which saves occur can be retrieved by the software version saver 310. This can allow the SCCMS 305 to be aware of when future saves might occur, which can aid in contextual data collection timing. Saves performed by, or indications of saves received by, the software version saver 310 can be used to associate contextual data of a user managing a version of software with the save of the version of software.

The contextual data receiver 315 can be configured to receive contextual data from one or more users performing updates on (e.g., managing) a version of software. The contextual data can be received from various sensors/devices within environments of users performing updates on the software. For example, the contextual data can be collected from sensors 345 of user device 340 and/or IoT sensors 380. The sensors 345 and/or IoT sensors 380 can be or include microphones, cameras, biometric sensors, location sensors (e.g., a global positioning system (GPS) or indoor positioning system (IPS)) and input devices (e.g., a mouse or keyboard), among other types of devices/sensors. The contextual data received by the contextual data receiver 315 can be collected over any suitable time interval, such as intermittently, periodically, continuously, and/or responsive to a save or a condition in which a future save will occur (e.g., a periodic autosave timing).

Any suitable contextual data can be captured from users updating the version of the software. For example, contextual data can include speech data (e.g., utterances from the user), visual data (e.g., images of the user and/or their environment), sentiment data (e.g., interpreted audio or visual data which can indicate sentiment of the user), biometrics (e.g., heart rate, glucose levels, facial recognition data, voice recognition data, etc.), location data (e.g., GPS coordinates), and device input data (e.g., mouse and/or keyboard actions), among other types of contextual data. In embodiments, contextual data can include social network data and/or chat data collected from one or more external applications (e.g., social media applications or chat applications, such as email clients or instant messaging applications).

The contextual data analyzer 320 can be configured to analyze the contextual data received by the contextual data receiver 315. Various analyses can be performed on the collected contextual data. In embodiments, sentiment analysis can be performed on speech data collected by one or more microphones and/or visual data collected by one or more cameras. In embodiments, the sentiment analysis can include measuring emotions and/or tone in speech (e.g., using IBM WATSON® Speech to Text and Tone Analysis). In embodiments, the sentiment analysis can be configured to detect emotions based on facial expressions (e.g., based on an analysis of image data of a user performing edits on software). The above speech and/or facial expression sentiments can be used to calculate a sentiment score. The sentiment score can be a value indicative of sentiment of a user managing the version of software. In embodiments, the sentiment score can be a value between 0 and 1, with values closer to 1 indicative of positive sentiment, and a values closer to 0 indicative of negative sentiment. However, the sentiment score can be any suitable range/magnitude of values used to designate a sentiment state of a user performing edits on software. In embodiments, the sentiment score can consider various weighted factors, such as a speech sentiment score factor and a facial expression sentiment score factor. The factors can be multiplied by respective weights and added to arrive at a final sentiment score calculation. The calculated sentiment score 375 can be stored in the software versioning repository with the save version 365 it corresponds to. In embodiments, the sentiment score can also consider textual data in addition to audio data (e.g., speech data) and/or visual data (e.g., facial expression data).

In embodiments, the contextual data analyzer 320 can be configured to analyze/classify a location based on received GPS and/or IPS technology. For example, the contextual data analyzer 320 can be configured to output a classification of a name of a location (e.g., "Home Office," "Work Office," "Remote Location," etc.) based on predefined locations designated by a user. This can be completed by referencing collected location coordinates/positions (e.g., collected by a GPS or IPS) against known classified location geofences (e.g., a first location "Home Office" can have a first designated geofence, a second location "Work Office" can have a second designated geofence, etc.). Thus, if current collected location data matches (e.g., falls within) a geofence of a known location, the contextual data analyzer 320 can output the classification of the known location.

In embodiments, the contextual data analyzer 320 can be configured to extract significant speech utterances (e.g., notable or otherwise important speech events related to the save of the software version) from users managing the version of the software. For example, if the contextual data analyzer 320 can be configured to extract a particular sentence or phrase uttered by a user upon completion of a save. Determining whether a particular speech utterance is important can be completed based on a set of predefined keywords, such as keywords or key phrases relating to the save (e.g., "buggy," "polished," "complete," "excellent," "needs to be fixed," etc.). Thus, speech data collected during the timeframe temporally related to the save can be referenced against a set of keywords designating significant speech. In response to any speech data within the timeframe matching to the set of keywords designating significant speech, significant speech phrases can be extracted from the speech data and stored with the association. In some embodiments, an audio file containing the uttered speech of the user managing the software during the timeframe temporally related to the save can be stored in the software versioning repository 360.

In embodiments, the contextual data analyzer 320 can be configured to analyze input interactions (e.g., mouse and keyboard inputs) to classify an input activity level that occurs during the timeframe corresponding to the save. For example, if many input interactions occur within the timeframe of the save, the contextual data analyzer 320 can be configured to classify the input interaction activity level as "High." However, if few input interactions occur during the timeframe corresponding to the save, the contextual data analyzer 320 can be configured to classify the input interaction activity level as "Low." Any suitable input activity classifications can be output without departing from the spirit and scope of the present disclosure. For example, input interaction classifications can be based on the input device which is analyzed (e.g., "High Mouse Activity" when many mouse input interactions are identified during the timeframe temporally related to the save, "Low Keyboard Activity" when few keyboard input interactions are identified during the timeframe temporally related to the save, etc.). The input activity classifications can provide indications of how much input activity was occurring during the timeframe temporally related to the save, which can roughly indicate how many inputs were necessary for updating the version of the software (depending on the timeframe in which the input activity is considered with respect to the total edit time for the version of software).

Upon receiving an indication of the save, the save/context associator 325 can be configured to associate contextual data captured by the contextual data receiver 315 and/or analyzed by the contextual data analyzer 320 with the version of the software for which the save was executed on. The contextual data which is associated with the save can correspond to a timeframe temporally related the save (e.g., a predetermined time window before and/or after the save). For example, the contextual data can correspond to a timeframe before the save (e.g., 5 minutes before the save), a timeframe encompassing the save (e.g., 2.5 minutes before the save and 2.5 minutes after the save), or a timeframe after the save (e.g., 5 minutes after a save is performed). Contextual data "corresponding to a timeframe" means that the contextual data is data collected during said timeframe. That is, if the timeframe is 5 minutes prior to the save, contextual data corresponding to the timeframe could include speech data, visual data, biometrics, location data, etc. that was collected 5 minutes prior to the save.

The association can be stored in the software versioning repository 360, which can be a datastore configured to store iterative versions of software as updates/saves occur over time. The software versioning repository 360 can include save versions 365 of various different software types. Each version can include respective captured contextual data 370 and a calculated sentiment score 375 corresponding to the timeframe when the version was saved.

Referring now to Table 1, shown is example software versioning repository data (e.g., software versioning repository 360), in accordance with embodiments of the present disclosure.

TABLE 1

Software Versioning Repository Data

| Software ID | Save Version | Biometrics (Heartbeat) | Sentiment Score | Location | Significant Speech |
|---|---|---|---|---|---|
| Operating System (OS) 1 | 1.00 | 75 BPM | 0.60 | Home Office | "Finally working, though slightly buggy" |
| Operating System (OS) 1 | 1.01 | 80 BPM | 0.70 | Work Office | "Fixed some of the bugs" |

TABLE 1-continued

Software Versioning Repository Data

| Software ID | Save Version | Biometrics (Heartbeat) | Sentiment Score | Location | Significant Speech |
|---|---|---|---|---|---|
| Operating System (OS) 1 | 1.02 | 120 BPM | 0.95 | Corporate HQ | "This is polished!" |
| Application 1 | 2.23 | 80 BPM | 0.30 | Home Office | "Not working as intended" |
| Application 1 | 2.23b | 115 BPM | 0.85 | Home Office | "There we go!" |
| Application 2 | V1.020 | 120 BPM | 0.95 | Work Office | "Perfect design!" |
| Application 2 | V1.021 | 80 BPM | 0.45 | Work Office | "This UI update is not pretty!" |
| File 1 | 1.00 | 73 BPM | 0.68 | Remote Location | "At least the rough draft is complete" |
| File 1 | 1.01 | 90 BPM | 0.89 | Remote Location | "After incorporating some changes, this version is better!" |

As shown in Table 1, various software identifications (IDs) and corresponding software versions, biometrics, sentiment scores, locations, and speech utterances are stored within the example software versioning repository. The software identification indicates the type/identity of software for which a save is performed on. The software version corresponds to the name/number of the version of software which is saved. The biometrics refer to collected biometric data (e.g., heart rate expressed in beats per minute (BPM), as shown in Table 1) captured during the timeframe when the contextual data was determined to be associated with the save of the software version. The sentiment scores refer to calculated sentiment scores which correspond to collected sensor data captured during the timeframe when the contextual data was determined to be associated with the saves of the version of software. The locations refer to locations which correspond to the location of the user managing the software when the versions of software were saved. The speech utterances refer to significant speech events which were uttered during the timeframe when the contextual data was determined to be associated with the saves. Thus, various contextual data associated with specific saves of versions of software at timeframes temporally related to the saves can be recorded in software versioning repository 360.

It is noted that Table 1 is simplified for the purpose of understanding and brevity. Values present in Table 1 may include average values, max values, median values, or other statistical measures calculated over the timeframe temporally related to the save. Other values can be present within the software versioning repository without departing from the spirit and scope of the present disclosure. For example, location can be expressed in coordinates rather than a location classification. As another example, sentiment can be stored as an emotional classification (e.g., "happy," "enthusiastic," "frustrated,") rather than a score indicative of positive/negative emotional sentiment. Further, speech can include all speech utterances that occurred within the timeframe temporally related to the save, rather than an extracted significant speech event as shown in Table 1. In some embodiments, an audio file containing the uttered speech of the user managing the software during the timeframe temporally related to the save can be stored in the software versioning repository 360. Further still, the saved version of software can be included within software versioning repository, or a link (e.g., a hyperlink) connected to the saved software version (e.g., directing the user towards the saved source code in an IDE) can be stored within the software versioning repository 360. In embodiments, changes (e.g., redlines) between a previous version of the software and the currently saved version of software can also be stored within the software versioning repository.

In embodiments where multiple users are performing edits/updates on the same version of software for which a save is executed on, the software versioning repository can include entries that correspond to contextual data of each user. For example, the contextual data of Table 1 may merely correspond to a first user. However, a second user may have a second set of contextual data that is associated with the versions of the saves at the timeframes temporally related to the saves. Thus, a first user can have a first set of contextual data associated with the saves and a second user can have a second set of contextual data associated with the saves. This can be completed for any number of users making updates on a saved version of software. Thus, contextual data associated with multiple users can be associated with the same save of the version of software. This can provide even more comprehensive data regarding contextual conditions surrounding saves of versions of software. This can further enhance development of the software in the future by allowing users to review contextual conditions associated with previous saves.

The retrieval condition identifier 330 can be configured to determine whether a condition is met for retrieving the version of software and/or contextual data associated with the version of software. In embodiments, conditions can be set for automatically retrieving historically captured saves of versions of software and associated contextual data. For example, a predetermined condition can be set that if a current save has a particular contextual metric (e.g., a low sentiment score, for example, of 0.50 or less), then a previous version of software having another particular contextual metric (e.g., a higher sentiment score, for example, 0.51 or greater) is retrieved. This can be completed based on any current contextual metric. For example, previous versions of software and associated contextual data can be automatically retrieved based on current biometric readings, determined locations, speech data (e.g., significant speech events or keywords), and visual data, among other potential contextual data. In embodiments, the retrieved pervious save of the version of software can have attributes/values that meet a particular classification or satisfy a particular threshold. For example, a save of a previous version of software having a particular location classification, sentiment classification, notable speech event or keyword, sentiment score, biometric reading level, etc. can be retrieved as dictated by a retrieval condition. In response to a retrieval condition being met, the save version data locator 335 can be configured to automatically retrieve save version(s) 365, captured contextual data 370, and/or calculated sentiment score(s) 375 based on the defined retrieval condition.

In embodiments, contextual data associated with a save of a version of software can be retrieved in response to a user request (e.g., a query). For example, a user can input a request (e.g., on a graphical user interface (GUI)) regarding a contextual condition of a save of a software version (e.g., please return a previous software version of "Software X" with a sentiment score above 0.90), regarding a particular version of a software (e.g., please return a previous software version of version number "Y"), or regarding a particular software identity (e.g., please return all previous versions associated with software ID "Z"). Such queries can return specific software versions and associated contextual data (e.g., all contextual data associated with a particular save of a version of software), all versions and associated contextual data associated with particular software identifications (e.g., all contextual data associated with all versions of a particular software), and/or specific contextual data entries related to specific versions of software (e.g., a single piece of contextual data related to a single version of software). The save version data locator 335 can then be configured to retrieve relevant save(s) of versions of software and associated contextual data based on the request. It is noted that any suitable type and/or amount of data stored within software versioning repository 360 can be retrieved based on a user request or a predetermined condition.

Figure 4:
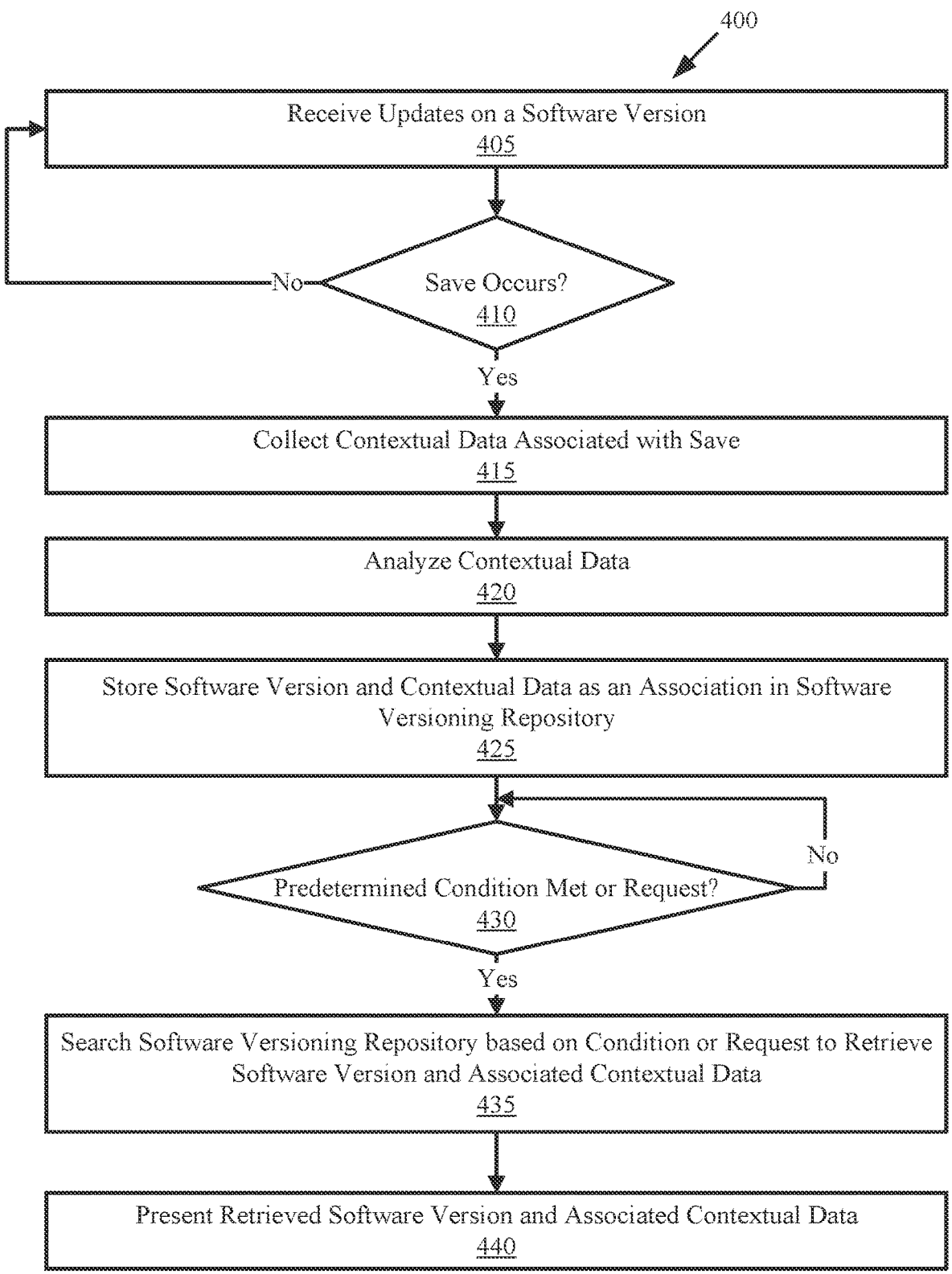
FIG. 4 is a flow-diagram illustrating an example method for save context capturing, in accordance with embodiments of the present disclosure.

Referring now to FIG. 4, shown is a flow-diagram of an example method 400 for save context capturing, in accordance with embodiments of the present disclosure. One or more operations of method 400 can be completed by one or more processing circuits (e.g., computer 101, devices 205, server 235, user device 340, SCCMS 305, IoT sensors 380).

Method 400 initiates at operation 405, where updates are received on a software version. A determination is then made whether a save occurs. This is illustrated at operation 410. An indication of save can be received based on a manual save or an automatic save. If a save does not occur ("No" at operation 410), then method 400 returns to operation 405, where updates are continued to be received on the software until a save occurs.

If a save does occur ("Yes" at operation 410), then contextual data associated with the save can be collected. This is illustrated at operation 415. In embodiments, contextual data collection can always occur (e.g., continuously), and does not necessarily have to be triggered by a save. In embodiments, contextual data collection can commence in response to a trigger for a future auto save (e.g., if periodic autosaves occur every 5 minutes, and contextual data is to be collected 5 minutes before a save, then contextual data collection can be triggered 5 minutes before the auto save). In embodiments, contextual data collection can encompass a save. That is, contextual data can be collected a predetermined time period before a save and after a save. However, contextual data collection can be configured in any suitable manner (e.g., periodically, continuously, intermittently, or responsive to a save or a condition in which a future save will occur). Contextual data can be collected by any sensors/devices discussed with respect to FIGS. 2-3. Further, contextual data can include any data discussed with respect to FIGS. 2-3.

The contextual data can then be analyzed. This is illustrated at operation 420. Contextual data can be analyzed in the manners described in FIGS. 2-3. For example, contextual data analysis can include location analysis, speech analysis, sentiment analysis, input interaction analysis, and other types of analysis.

The software version and the contextual data are stored as an association in a software versioning repository. This is illustrated at operation 425. Storing the association can be completed in the same, or a substantially similar manner, as described with respect to FIGS. 2-3. For example, Table 1, described with respect to FIG. 3, shows example associations between software identifications, versions, and various contextual data.

A determination is made whether a predetermined condition is met or a request is made for retrieval of a save of a version of software and associated contextual data. This is illustrated at operation 430. If a determination is made that the predetermined condition is not met ("No" at operation 430), then method 400 can continue to monitor whether a predetermined condition is met or a request is made for retrieval of the save of the version of software and associated contextual data.

If a determination is made that the predetermined condition is met ("Yes" at operation 430), then the software versioning repository can be searched to locate the save of the version of software and associated contextual data based on the predetermined condition or request. This is illustrated at operation 435. In embodiments, multiple software identities, versions, and/or pieces of contextual data can be returned based on the predetermined condition or request. The retrieved software version(s) and associated contextual data are then presented to a user. This is illustrated at operation 440.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

Several examples will now be provided to further clarify various aspects of the present disclosure:

Example 1: A method comprising receiving an indication of a save of a version of a software, associating contextual data associated with a user managing the version of the software with the save of the version of the software, the contextual data captured during a timeframe temporally related to the save, storing the association between the contextual data and the save of the version of the software in a software versioning repository, and retrieving, from the software versioning repository, the save of the version of the software and the associated contextual data in response to a predetermined condition or a request.

Example 2: The limitations of Example 1, wherein the contextual data includes sentiment data collected from the user, wherein the sentiment data is analyzed to generate a sentiment score associated with the save of the version of software, wherein the sentiment score is stored in the software versioning repository with the association and is retrieved with the save of the version of software in response to the predetermined condition or the request.

Example 3: The limitations of any of Examples 1-2, wherein the timeframe temporally related to the save includes a predetermined time period prior to the save and a predetermined time period after the save.

Example 4: The limitations of any of Examples 1-3, wherein the contextual data includes speech data collected from the user during the timeframe, wherein the speech data is stored in the software versioning repository with the association and is retrieved with the save of the version of software in response to the predetermined condition or the request.

Example 5: The limitations of Example 4, wherein the speech data is analyzed to extract a significant speech event based on comparison between the speech data and a set of keywords designating significant speech, wherein the significant speech event is stored with the association.

Example 6: The limitations of any of Examples 4-5, wherein the speech data is saved as an audio file within the software versioning repository with the association, the audio file corresponding to the timeframe temporally related to the save.

Example 7: The limitations of any of Examples 1-6, wherein retrieving the save of the version of software and the associated contextual data is in response to the predetermined condition, wherein the predetermined condition specifies that the save of the version of software and the associated contextual data is retrieved in response to a current contextual metric associated with a current version of software not satisfying a threshold.

Example 8: The limitations of any of Examples 1-7, wherein retrieving the save of the version of software and the associated contextual data is in response to the request, wherein the request is received from a user on a graphical user interface (GUI) and specifies retrieval of the save of the version of software and the associated contextual data based on a particular contextual metric within the contextual data specified within the request.

Example 9: A system comprising one or more processor and one or more computer-readable storage media collectively storing program instructions which, when executed by the processor, are configured to cause the processor to perform a method according to any of Examples 1-8.

Example 10: A computer program product comprising one or more computer readable storage media, and program instructions collectively stored on the one or more computer readable storage media, the program instructions comprising instructions configured to cause one or more processors to perform a method according to any one of Examples 1-8.

What is claimed is:

1. A method comprising:
   receiving an indication of a save of a version of a software;
   associating contextual data associated with a user managing the version of the software with the save of the version of the software, the contextual data captured during a timeframe temporally related to the save, wherein the contextual data includes a classification of a location determined by comparing global positioning system (GPS) coordinates of the user managing the version of the software with a geofence corresponding to the classification of the location;
   storing the association between the contextual data and the save of the version of the software in a software versioning repository;
   determining that a save of a current version of the software has a second classification of a location by comparing current global positioning system (GPS) coordinates of the user managing the version of the software with a second geofence corresponding to the second classification of the location; and
   retrieving, from the software versioning repository, the save of the version of the software and the associated contextual data in response to determining that the save of the current version of the software has the second classification of the location, wherein the retrieved version of the software is used to update the current version of the software.

2. The method of claim 1, wherein the contextual data includes sentiment data collected from the user, wherein the sentiment data is analyzed to generate a sentiment score associated with the save of the version of software, wherein the sentiment score is stored in the software versioning repository with the association and is retrieved with the save of the version of software.

3. The method of claim 1, wherein the timeframe temporally related to the save includes a predetermined time period prior to the save and a predetermined time period after the save.

4. The method of claim 1, wherein the contextual data includes speech data collected from the user during the timeframe, wherein the speech data is stored in the software versioning repository with the association and is retrieved with the save of the version of software.

5. The method of claim 4, wherein the speech data is analyzed to extract a significant speech event based on comparison between the speech data and a set of keywords designating significant speech, wherein the significant speech event is stored with the association.

6. The method of claim 4, wherein the speech data is saved as an audio file within the software versioning repository with the association, the audio file corresponding to the timeframe temporally related to the save.

7. The method of claim 1, wherein retrieving the save of the version of software and the associated contextual data is in response to a request, wherein the request is received from a user on a graphical user interface (GUI) and specifies retrieval of the save of the version of software and the associated contextual data based on a particular contextual metric within the contextual data specified within the request.

8. A system comprising:
one or more processors; and
one or more computer-readable storage media collectively storing program instructions which, when executed by the one or more processors, are configured to cause the one or more processors to perform a method comprising:
receiving an indication of a save of a version of a software;
associating contextual data associated with a user managing the version of the software with the save of the version of the software, the contextual data captured during a timeframe temporally related to the save, wherein the contextual data includes a classification of a location determined by comparing global positioning system (GPS) coordinates of the user managing the version of the software with a geofence corresponding to the classification of the location;
storing the association between the contextual data and the save of the version of the software in a software versioning repository;
determining that a save of a current version of the software has a second classification of a location by comparing current global positioning system (GPS) coordinates of the user managing the version of the software with a second geofence corresponding to the second classification of the location; and
retrieving, from the software versioning repository, the save of the version of the software and the associated contextual data in response to determining that the save of the current version of the software has the second classification of input activity, wherein the retrieved version of the software is used to update the current version of the software.

9. The system of claim 8, wherein the contextual data includes sentiment data collected from the user, wherein the sentiment data is analyzed to generate a sentiment score associated with the save of the version of software, wherein the sentiment score is stored in the software versioning repository with the association and is retrieved with the save of the version of software.

10. The system of claim 8, wherein the contextual data includes speech data collected from the user during the timeframe, wherein the speech data is stored in the software versioning repository with the association and is retrieved with the save of the version of software.

11. The system of claim 10, wherein the speech data is analyzed to extract a significant speech event based on comparison between the speech data and a set of keywords designating significant speech, wherein the significant speech event is stored with the association.

12. The system of claim 10, wherein the speech data is saved as an audio file within the software versioning repository with the association, the audio file corresponding to the timeframe temporally related to the save.

13. The system of claim 8, wherein retrieving the save of the version of software and the associated contextual data is in response to a request, wherein the request is received from a user on a graphical user interface (GUI) and specifies retrieval of the save of the version of software and the associated contextual data based on a particular contextual metric within the contextual data specified within the request.

14. A computer program product comprising one or more computer readable storage media, and program instructions collectively stored on the one or more computer readable storage media, the program instructions comprising instructions configured to cause one or more processors to perform a method comprising:
receiving an indication of a save of a version of a software;
associating contextual data associated with a user managing the version of the software with the save of the version of the software, the contextual data captured during a timeframe temporally related to the save, wherein the contextual data includes a classification of a location determined by comparing global positioning system (GPS) coordinates of the user managing the version of the software with a geofence corresponding to the classification of the location;
storing the association between the contextual data and the save of the version of the software in a software versioning repository;
determining that a save of a current version of the software has a second classification of a location by comparing current global positioning system (GPS) coordinates of the user managing the version of the software with a second geofence corresponding to the second classification of the location; and
retrieving, from the software versioning repository, the save of the version of the software and the associated contextual data in response to the second sentiment score not satisfying a sentiment threshold, wherein the retrieved version of the software is used to update the current version of the software.

15. The computer program product of claim 14, wherein the sentiment score is stored in the software versioning repository with the association and is retrieved with the save of the version of software.

16. The computer program product of claim 14, wherein the speech data is stored in the software versioning repository with the association and is retrieved with the save of the version of software.

17. The computer program product of claim 16, wherein the speech data is analyzed to extract a significant speech event based on comparison between the speech data and a set of keywords designating significant speech, wherein the significant speech event is stored with the association.

18. The computer program product of claim 16, wherein the speech data is saved as an audio file within the software versioning repository with the association, the audio file corresponding to the timeframe temporally related to the save.

* * * * *